(12) United States Patent
Shelekhin et al.

(10) Patent No.: US 6,887,618 B2
(45) Date of Patent: May 3, 2005

(54) ELECTROCHEMICAL CELL WITH FLAT CASING AND VENT

(75) Inventors: Alexander Shelekhin, Ridgefield, CT (US); Robert S. Ferrin, Bethel, CT (US); Matthew Sylvestre, Woodbury, CT (US); Steven J. Specht, Brookfield, CT (US); Michael F. Roberts, Brookfield, CT (US); Mark Ashbolt, Newtown, CT (US)

(73) Assignee: The Gillette Company, Boston, MA (US)

(*) Notice: Subject to any disclaimer, the term of this patent is extended or adjusted under 35 U.S.C. 154(b) by 412 days.

(21) Appl. No.: 10/216,311

(22) Filed: Aug. 9, 2002

(65) Prior Publication Data

US 2004/0028995 A1 Feb. 12, 2004

(51) Int. Cl.$^7$ .......................... H01M 2/08; H01M 2/12; H01M 6/12; H01M 2/04
(52) U.S. Cl. ......................... 429/175; 429/56; 429/162; 429/176
(58) Field of Search .......................... 429/56, 162, 175, 429/176

(56) References Cited

U.S. PATENT DOCUMENTS

| | | | |
|---|---|---|---|
| 3,218,197 A | 11/1965 | Carmichael et al. | 136/133 |
| 3,219,488 A * | 11/1965 | Southworth, Jr. | 429/56 |
| 3,314,824 A | 4/1967 | Spanur | 136/178 |
| 3,617,386 A | 11/1971 | Bosben et al. | 136/107 |
| 4,191,806 A * | 3/1980 | Levy | 429/56 |
| 4,227,701 A | 10/1980 | Tsuchida et al. | 277/12 |
| 4,237,203 A | 12/1980 | Tsuchida et al. | 429/122 |
| 5,080,984 A | 1/1992 | Thibault et al. | 429/94 |
| 5,080,985 A | 1/1992 | Wiacek et al. | 429/172 |
| 6,127,062 A | 10/2000 | Sargeant et al. | 429/53 |
| 6,780,539 B2 * | 8/2004 | Shelekhin et al. | 429/159 |

* cited by examiner

Primary Examiner—Gregg Cantelmo
Assistant Examiner—Thomas H. Parsons
(74) Attorney, Agent, or Firm—Barry D. Josephs; Thomas G. Krivulka

(57) ABSTRACT

An electrochemical cell generating hydrogen gas upon discharge, wherein the cell has an outer casing, a vent aperture passing through a wall of the casing, and a rupturable membrane covering the vent aperture. The outer casing preferably has a flat wall running along the cell's length and a vent aperture passing through the flat wall. The cell may typically be an alkaline cell in the shape of a cuboid. The rupturable membrane may be secured by a ring facing the inside surface of the flat wall of the casing in a position adjacent the vent aperture. The rupturable membrane is preferably of polysulfone. The membrane allows hydrogen gas to permeate therethrough to the environment and is rupturable if hydrogen gas within the cell interior builds up rapidly to a threshold pressure level. Optionally, a pointed puncture member extends into the vent aperture to assist membrane rupture.

20 Claims, 9 Drawing Sheets

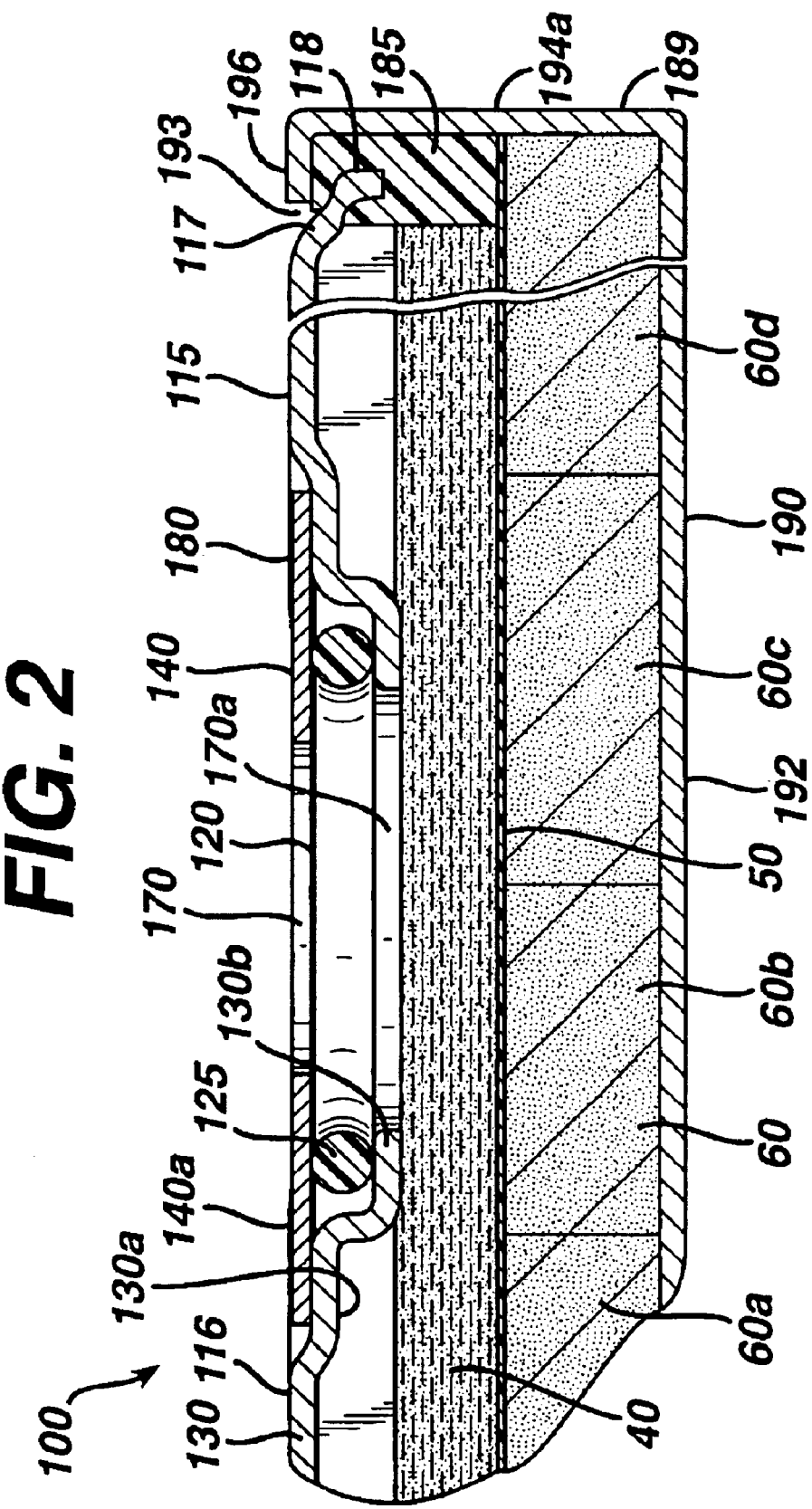

ELECTROCHEMICAL CELL WITH FLAT CASING AND VENT

FIELD OF THE INVENTION

The invention relates to an electrochemical cell having a vent aperture in the wall of the outer casing and rupturable membrane covering the vent aperture. The invention relates to a flat cell, which may be an alkaline cell having an anode comprising zinc, a cathode comprising manganese dioxide, and an electrolyte comprising aqueous potassium hydroxide.

BACKGROUND

Conventional alkaline batteries (alkaline electrochemical cells) have an anode comprising zinc and a cathode comprising manganese dioxide. The cell is typically formed of an elongated cylindrical outer casing. The fresh cell has an open circuit voltage (EMF) of about 1.5 volt and typical average running voltage of between about 1.0 to 1.2 Volt in medium drain service (100 to 300 milliamp.) The cylindrical casing is initially formed with an enlarged open end and opposing closed end. After the cell contents are supplied, an end cap with insulating plug is inserted into the open end of the casing to form the negative terminal. The cell's open end is closed by crimping the casing edge over an edge of the insulating plug and radially compressing the casing around the insulating plug to provide a tight seal. A portion of the cell casing at the opposing closed end forms the positive terminal.

Primary alkaline electrochemical cells typically include a zinc anode active material, an alkaline electrolyte, a manganese dioxide cathode active material, and an electrolyte permeable separator film, typically of cellulose or cellulosic and polyvinylalcohol fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, small amount of polymeric binders, for example polyethylene binder and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable, since it has a high density and high purity. The electrical conductivity of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector in conventional cylindrical alkaline cells. Suitable electrically conductive additives can include, for example, graphite, graphitic material, conductive carbon powders, such as carbon blacks, including acetylene blacks. Preferably the conductive material comprises flaky crystalline natural graphite, or flaky crystalline synthetic graphite, including expanded or exfoliated graphite or graphitic carbon nanofibers and mixtures thereof.

There are small size rectangular shaped rechargeable batteries now available, which are used to power small electronic devices such as MP3 audio players and mini disk (MD) players. These batteries are typically in the shape of a small cuboid (rectangular parallelepiped) somewhat the size of a pack of chewing gum. Such batteries, for example, can be in the form of replaceable rechargeable nickel metal hydride (NiMH) size F6 or 7/5F6 size cuboids in accordance with the standard size for such batteries as set forth by the International Electrotechnical Commission (IEC). The F6 size has a thickness of 6.1 mm, width of 17.3 mm and length of 35.7 mm. There is a version of the F6 size wherein the length can be as great as about 48.0 mm. The 7/5F6 size has thickness of 6.1 mm, width of 17.3 mm, and length of 67.3 mm. According to the IEC standard allowed deviation for the 7/5F6 size in thickness is +0 mm, −0.7 mm; in width is +0 mm, −1 mm; and in length is +0, −1.5 mm. The average running voltage of the F6 or 7/5F6 NiMH rechargeable batteries when used to power miniature MP3 audio or mini disk (MD) players is between about 1.1 and 1.4 volt typically about 1.12 volt.

When used to power the mini disk (MD) player the battery is drained at a rate of between about 200 and 250 milliAmp. When used to power an MP3 player the battery is drained typically at a rate of about 100 milliAmp.

It would be desirable to have a small flat alkaline battery of the same size and shape as small size cuboid shaped (rectangular parallelepiped) nickel metal hydride batteries, so that the small alkaline size battery can be used interchangeably with the nickel metal hydride battery to power small electronic devices such as mini disk or MP3 players.

It would be desirable to use a primary (nonrechargeble) alkaline battery as a replacement for small rectangular shaped rechargeable batteries, particularly small size nickel metal hydride rechargeable battery.

SUMMARY OF THE INVENTION

A principal aspect of the invention is directed to an electrochemical cell which generates hydrogen gas upon discharge, wherein said cell has an outer casing, desirably a metallic outer casing, a vent aperture passing through a wall of said casing, and a rupturable membrane covering said vent aperture. The outer casing may have a flat wall running along the cell's length and a vent aperture passing through said flat wall. The outer casing is preferably of metal, but may also be of plastic material. The cell may typically be an alkaline cell in the shape of a cuboid. Optionally, a pointed puncture member extends into the vent aperture. The pointed puncture member causes the membrane to tear at the moment of rupture.

A principal aspect of the invention is directed to a primary alkaline battery (alkaline cell) comprising an outer metal casing which may have at least one flat wall running along the length of the casing and a vent aperture passing through said flat wall. The term "vent aperture" as used herein is an opening in the casing wall which allows gas from the cell interior to pass therethrough to the external environment. The battery is typically elongated with the flat wall running along the length of the outer casing and the vent aperture passing through the flat wall. The alkaline cell preferably has an anode comprising zinc, a cathode comprising manganese dioxide and an electrolyte comprising aqueous potassium hydroxide. The rupturable membrane can be secured to the inside surface of the casing to face and cover the vent aperture. Alternatively, the membrane can be secured so that it lies within the vent aperture and extends across the aperture thereby covering it.

The cell outer metal casing is conveniently fabricated from two pieces, namely a bottom housing which is open on one side along its length and a metallic top cover. The metallic top cover comprises a predominant flat wall which defines the cover's body surface. The metallic top cover, which preferably has an insulating ring along its edge, is secured to cover the open side of the housing after the housing has been filled with anode, cathode, electrolyte and separator. The vent aperture is preferably located so that it passes through the cover flat wall. The anode and cathode are preferably stacked within in layers or slabs body to body (as in a stack of coins) with separator therebetween so that the anode faces the metallic top cover and the cathode faces the closed side of the bottom housing. The anode is in electrical contact with the metallic top cover and the cathode is in electrical contact with the bottom housing. The anode and cathode are preferably not encased in plastic material. Therefore, in a preferred embodiment the anode can be in direct physical contact with the top metallic cover and the cathode can be in direct physical contact with the bottom metallic housing. In such embodiment any surface of the top metallic cover can function as the battery's negative terminal and any surface of the bottom metallic housing can function as the battery's positive terminal.

The rupturable membrane can be selected from polymeric films which are permeable to hydrogen gas and reliably rupturable at a threshold gas pressure exceeding 50 psig ($345 \times 10^3$ pascal gage), more typically a pressure exceeding about 200 psig ($1379 \times 10^3$ pascal gage), or more generally a pressure between about 50 ($345 \times 10^3$ pascal gage)and 200 psig ($1379 \times 10^3$ pascal gage). (Pressures are reported herein as gage pressure, that is, pressure amount above atmospheric.) A preferred membrane is polysulfone film which has a high hydrogen permeability coefficient, but other hydrogen permeable membranes such as polyethylene, polypropylene, or nylon can also be used. The polysulfone film desirably has a thickness of between about 1 and 1.5 mil (0.0254 mm and 0.0381 mm) and lies adjacent to a vent aperture having a diameter typically between about 5.5 and 7.5 mm. Under such design conditions it has been determined that the polysulfone membrane will rupture when the hydrogen gas pressure within the cell builds up to a level between about 90 and 200 psig ($620 \times 10^3$ and $1379 \times 10^3$ pascal gage), typically between about 90 and 120 psig ($620 \times 10^3$ and $827 \times 10^3$ pascal gage). As hydrogen gas builds up within the cell interior under conditions of normal usage or storage the hydrogen gas build up in the cell tends to be gradual and will dissipate gradually through the membrane. Under such normal conditions the hydrogen gas pressure within the cell is maintained at pressure levels generally under about 200 psig ($1379 \times 10^3$ pascal gage), more usually under about 120 psig ($620 \times 10^3$ pascal gage), desirably under 50 psig ($345 \times 10^3$ pascal gage). If the gas pressure builds up rapidly to a level exceeding 200 psig ($1379 \times 10^3$ pascal gage), typically rapid build up to a level between about 50 and 200 psig ($345 \times 10^3$ and $1379 \times 10^3$ pascal gage), more typically rapid build up to a level between about 90 and 120 psig ($620 \times 10^3$ and $827 \times 10^3$ pascal gage), the membrane will rupture allowing hydrogen gas to abruptly escape from the cell interior to the environment.

The cell preferably has an outer metal casing having the overall shape of a polyhedron, typically an elongated polyhedron wherein each of the faces or sides is a flat polygon. The outer casing comprising flat polygonal sides can also have the overall shape of a prism. Preferably the outer casing has the shape of a cuboid (rectangular parallelepiped). In such embodiment the outer metal casing has a body surface which comprises two pair of opposing rectangular sides and a pair of opposing ends which are rectangular.

In one aspect the rupturable membrane covers a vent aperture passing through one of the flat walls running along the length of the cell's outer casing. The rupturable membrane can lie adjacent to or within the vent aperture so that it covers said vent aperture. An integrally formed portion of said flat wall in the outer casing can have a pointed member protruding into the vent aperture within the casing wall so that as the membrane ruptures it contacts and is torn or abraded by pointed member. Alternatively, a disk having an opening therein can be used to cover the rupturable membrane. The rupturable membrane in turn covers the vent aperture. A pointed member forming an integral portion of the disk can protrude into the disk opening. As the membrane ruptures it contacts and is torn or abraded by the pointed member in the disk. It has been determined that if such abrasion of tear is produced in the membrane surface at the point of rupture, the membrane breaks along the tear line thereby allowing gas to escape therethrough without taking along with it significant quantity of liquid electrolyte.

In another aspect the membrane can be part of a vent assembly, which is positioned within a vent aperture running through a flat wall of the cell's outer casing. The flat wall containing the aperture can run along the length of the cell's outer casing. The membrane can be held in place by a metal crimp ring which is welded to or forms an integral part of the outer casing. A resilient insulating ring can be inserted between the crimp ring and the rupturable membrane. Alternatively, the membrane can be molded so that it forms an integral central portion of the insulating ring. The crimp ring and insulating ring hold the membrane in place along or near the inside surface of the casing flat wall so that it covers the vent aperture. There can be a pointed member positioned above the membrane and protruding into the vent aperture. The pointed member can be an integral part of the outer casing. Alternatively, the pointed member can form a portion of a separate disk which can be welded into the vent aperture in position above the rupturable membrane. In either case if the hydrogen gas pressure within the cell rises abruptly to exceed the design threshold pressure, desirably a level between about 50 and 200 psia ($345 \times 10^3$ and $1379 \times 10^3$ pascal gage), the pointed member produces a tear in the surface of the membrane at the point of rupture. This has the beneficial effect of allowing hydrogen gas to escape through the tear yet there is enough of the membrane still intact so that significant quantity of electrolyte liquid is not carried into the environment with the escaped gas.

BRIEF DESCRIPTION OF THE DRAWINGS

FIG. 2 is a longitudinal cross section of a second embodiment of the flat alkaline battery of the invention.

FIG. 4A-1 is a perspective view of the vent disk cover for the components shown in FIG. 4A.

DETAILED DESCRIPTION

Figure 1:
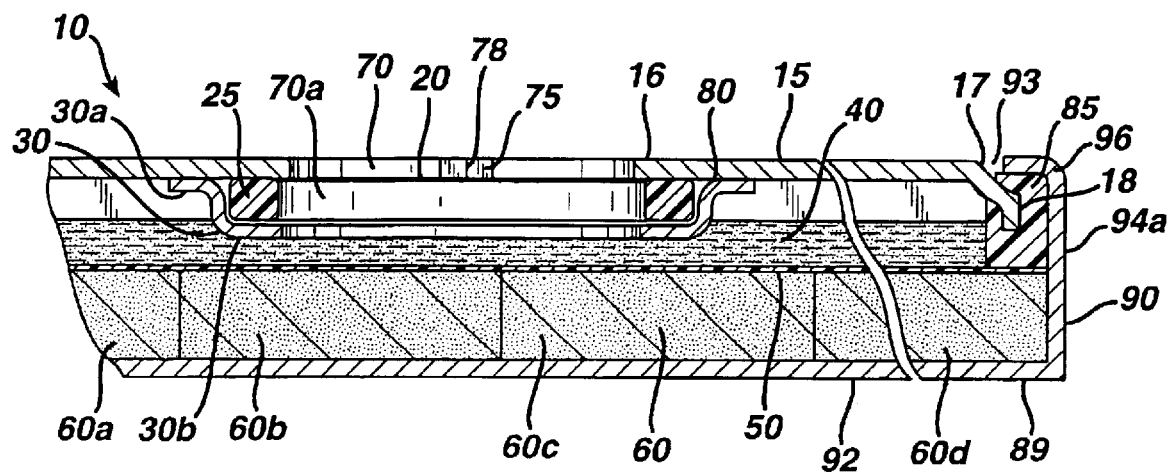
FIG. 1 is a longitudinal cross section of a first embodiment of the flat alkaline battery of the invention.
Figure 1A:
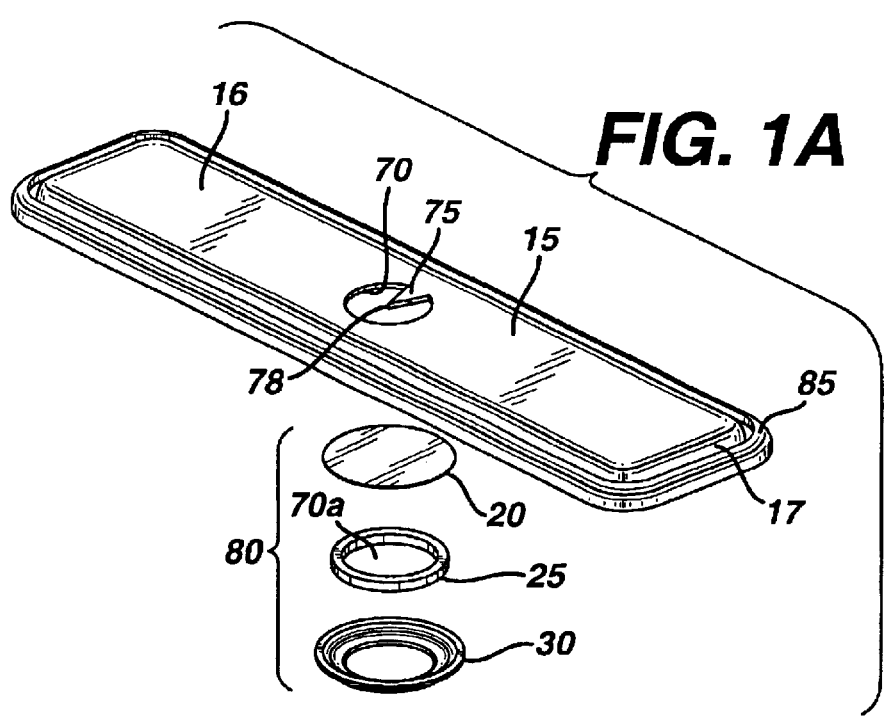
FIG. 1A is an exploded view showing the vent assembly of the embodiment of the flat alkaline battery shown in FIG. 1.
Figure 1B:
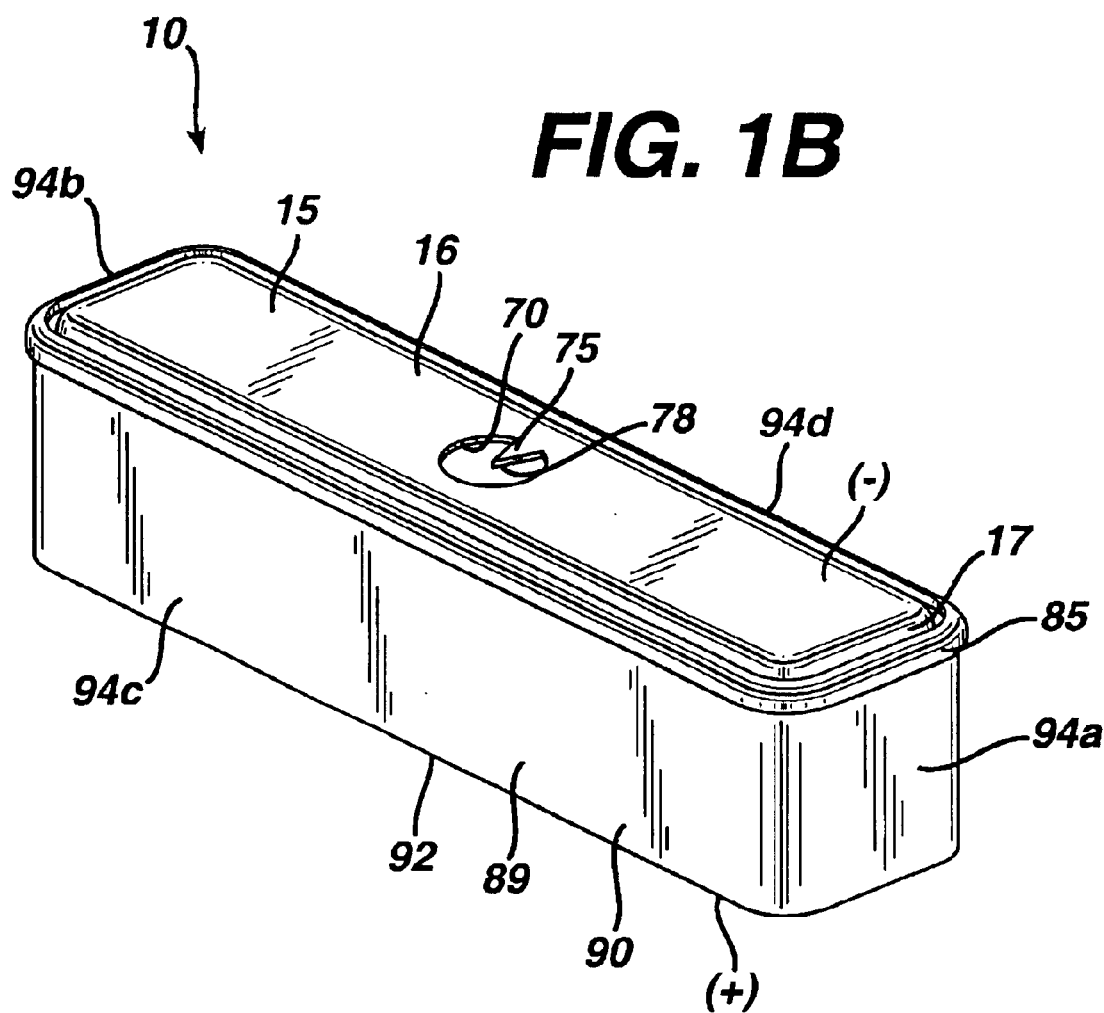
FIG. 1B is a perspective view of the battery comprising the components shown in FIG. 1.

An embodiment of the flat alkaline primary battery (alkaline cell) 10 of the invention is shown in FIGS. 1–1B. The alkaline cell 10 (FIGS. 1–1B) has an outer metal casing 89 having an elongated metal body surface with a major portion thereof having a flat polygonal shape. The outer casing 89 may have the overall shape of a polyhedron having flat polygonal surfaces. In a preferred embodiment the finished battery 10 has the overall shape of a cuboid (rectangular parallelepiped). Battery 10, for example, can have an overall size and shape the same or similar to an 7/5F6 size (IEC standard) rechargeable battery. Such battery has the overall cuboid shape shown in FIG. 1B with a length of about 67 mm, width of 17 mm and thickness of 6 mm. In such size and shape the battery 10 of the invention can be used as a replacement for the 7/5F6 size nickel metal hydride rechargeable battery as power source for electronic devices such as the mini disk (MD) player model MZ-900 from Sony Corp. Such replacement service is offered by way of example and is not intended to be limiting. The embodiment of the battery shown in FIGS. 1–1B can be made in larger or smaller sizes.

The alkaline cell 10 (FIGS. 1 and 1B) has an outer metal casing 89 having an elongated metal body surface with a major portion thereof having at least one flat polygonal shape. The outer casing 89 may have the overall shape of a polyhedron having flat polygonal surfaces. In a specific embodiment shown in FIGS. 1 and 1B, the alkaline cell 10 has the overall shape of a cuboid (rectangular parallelepiped). Cell 10 has an outer metal casing 89 comprising a housing 90 which is sealed with a top cover 15 after the cell contents are supplied. The housing 90 is preferably of nickel plated cold rolled steel or stainless steel. The top cover 15 is preferably tin plated cold rolled steel or stainless steel. The cell contents comprises an anode 40 comprising particulate zinc, a cathode 60 comprising manganese dioxide and a separator 50 therebetween. Any portion of the top cover can function as the cell's negative terminal (−) and any portion of the housing 90 can function as the cell's positive terminal (+).

The metal housing 90 has a bottom flat surface 92 with a pair of opposing vertical end walls 94a and 94b forming opposing ends of the housing and a pair of vertical side wall 94c and 94d forming the long sides of the housing (FIG. 1B). Housing 90 thus has an elongated top opening 93 (FIG. 1) which is closed with top cover 15. The side walls 94a and 94b (FIG. 1B) are preferably all integral with the bottom surface 92, that is, the housing 90 is an integral piece. The top cover 15 has a flat top surface 16 which extends to downwardly sloping edge 17 terminating in outer peripheral edge 18 (FIG. 1). There is an outer insulating seal 85 circumventing the outer edge 18 of the top cover 15. Preferably outer insulating seal 85 is in the form of a molded plastic ring which is molded to and covers outer edge 18 of top cover 15, or is the form of a separate "stand-alone" molded plastic ring that is placed over outer edge 18 of top cover 15. After the cell contents are inserted into the interior of housing 90, cover 15 is inserted over the top opening 93 of housing 90 and the peripheral edge 96 of housing 90 is crimped over outer insulating seal 85.

Top cover 15 has a vent aperture 70 creating a vent space 70a therebelow which extends partially into the cell interior as shown in FIG. 1. There is a vent seal assembly 80 underlying vent aperture 70. The seal assembly 80 as shown in FIG. 1 is designed to hold a rupturable vent membrane 20 tightly in position across vent space 70a immediately below aperture 70. The seal assembly 80 as shown best in FIGS. 1 and 1A comprises an insulating seal ring 25, crimp ring 30 and rupturable membrane 20. Seal assembly 80 is constructed by placing rupturable membrane 20 across the inside surface of top cover 15 so that it underlies aperture 70. An insulating seal ring 25 is placed along the edge of membrane 20. Seal ring 25 is desirably of nylon but may be of a rubbery or other plastic material which is compressible, resilient and durable and can withstand exposure to alkaline electrolyte. A metal crimp ring 30 is positioned around seal ring 25. The top edge 30a of metal crimp ring 30 is welded, preferably by laser welding or ultrasonic welding to the inside surface of top cover 15. The bottom edge 30b of crimp ring 30 is then crimped around the seal ring 25 thereby tightly compressing seal ring 25 against the inside surface of top cover 15. The compressed seal ring 25 holds the edge of membrane 20 tightly in place against the inside surface of top cover 15.

As shown best in the exploded view of FIG. 1A there is a piece 75 which forms an integral portion of top surface 16, which protrudes into vent aperture 70. Protruding piece 75 terminates in puncture point 78 which penetrates into the middle of aperture 70. Hydrogen gas gradually builds up within the alkaline cell 10 during discharge and possibly also during storage of the cell. Membrane 20 is of a hydrogen permeable material which allows hydrogen gas to gradually escape from the cell. Membrane 20 is desirably of polyethylene, polypropylene, nylon or polysulfone or other material which is permeable to hydrogen. However, polysulfone has been determined to be a preferred material for membrane 20, since for a given thickness it exhibits a high hydrogen permeation rate and also is essentially oxygen impermeable. The polysulfone membrane 20 has a hydrogen permeability coefficient of about $1.069 \times 10^{-8}$ (cm$^3$ H$_2$*cm thickness)/(cm$^2$ area*cm Hg pressure*second) at 25° C. The cm Hg pressure is the pressure measured in centimeter of mercury at which the rate of H$_2$ permeation through a given polysulfone membrane is to be determined. (A test conducted at atmospheric pressure is equivalent to 76.0 cm mercury.) The impermeability of polysulfone to oxygen is a desirable property, since entry of significant amounts of atmospheric oxygen into the cell interior would react with the anode zinc producing zinc oxide, in turn causing reduction in the cell's performance and capacity. Under normal discharge or storage conditions the cell's production of hydrogen will gradually permeate through membrane 20 and be released to the environment through aperture 70. However, in the event of a misuse, for example, deliberate or accidental shorting of the cell or storage under extremely hot environmental conditions, there is greater risk of an abrupt buildup in hydrogen and accompanying abrupt increase in the cell's internal gas pressure. In such case as the cell's internal pressure builds rapidly to a predetermined design threshold, membrane 20 will rupture thereby relieving the cell immediately of the elevated gas pressure. In such situation, at the point immediately preceding rupture, membrane 20 expands into aperture 70 and impinges against protruding puncture point 78. At the moment of rupture, puncture point 78 produces an abrasion or tear in the surface of the membrane. This allows gas to escape quickly through the tear without carrying large amounts of liquid electrolyte with it, which could be environmentally harmful.

The size of aperture 70 and thickness of membrane 20 can be adjusted in order to assure that membrane 20 ruptures when hydrogen gas within the cell builds up to the desired threshold pressure. In conventional zinc/$MnO_2$ alkaline cells the cell's overall shape is cylindrical. In such cells, the internal hydrogen gas pressure can be left to build up to levels, typically between about 600 psig and 1200 psig ($4137 \times 10^3$ and $8274 \times 10^3$ pascal gage) or even somewhat higher pressures before the vent membrane bursts or other venting mechanism activates to relieve the cell of the pressure build up. Such cylindrical cells can normally withstand such internal gas pressure buildup with outer casing wall thicknesses typically between about 6 to 15 mils (0.152 and 0.381 mm). However, with the flat cell design of the present invention, in particular with cell 10 being a cuboid (rectangular parallelepiped) the outer casing at nominal wall thicknesses of between about 6 and 15 mils (0.152 and 0.381 mm) would tend to bulge outward as the internal gas pressure reached much above 200 psig ($1379 \times 10^3$ pascal gage). (An outer casing wall thicknesses much above 15 mils is not attractive, since it adds significantly to the cost of the cell and reduces the available internal volume for anode and cathode active materials.) Thus, in the flat cell (cuboid) design depicted in FIGS. 1 and 1B, it has been determined desirable to design the vent aperture 70 and membrane 20 so that the membrane 20 ruptures at pressures less than about 200 psig ($1379 \times 10^3$ pascal gage), desirably between about 50 psia and 200 psig ($345 \times 10^3$ and $1379 \times 10^3$ pascal gage), preferably between about 100 psig and 200 psig ($689 \times 10^3$ and $1379 \times 10^3$ pascal gage). In the embodiment of the invention shown in FIG. 1 the metal housing 90 and housing cover 15 which form casing 89 are desirably of nickel plated cold rolled steel or stainless steel for housing 90 and tin plated cold rolled steel or stainless steel for housing cover 15, both having a wall thickness between about 10 and 15 mil (0.25 and 0.38 mm).

The combination of aperture 70 radius "R" and membrane 20 thickness, t, can be adjusted by the following formula so that the membrane ruptures at the desired rupture pressure, $P_r$, where S, is the ultimate tensile strength of the rupturable material:

$$P_r = t/R \times S \quad (I)$$

The design of the seal assembly 80 depicted in FIG. 1 and 1A has the advantage that membranes of very small thickness can be used since the membrane 20 is a separate continuous sheet, thereby permitting membrane 20 to be manufactured, e.g., by extrusion to very small thickness. The use of small thickness membrane 20 makes it easier to achieve the desired relatively low rupture pressure of between about 50 and 200 psig ($345 \times 10^3$ and $1379 \times 10^3$ pascal gage) without making the aperture 70 inordinately large.

In the case of a polysulfone membrane 20, the vent aperture 70 diameter is desirably between about 5.5 mm and 7.5 mm, preferably about 0.25 inch (6.35 mm) and the membrane thickness between about 1 and 1.5 mil (0.0254 mm and 0.0381 mm). Such combination of aperture 70 diameter and polysulfone membrane 20 thickness will allow the membrane 20 to rupture when gas pressure buildup within the cell reaches a threshold level less than 200 psig ($1379 \times 10^3$ pascal gage), desirably a level between about 50 and 200 psig ($345 \times 10^3$ and $1379 \times 10^3$ pascal gage). Polysulfone membrane of such thickness is obtainable from Amoco under the trade designation UDEL film. For vent aperture 70 diameter of 0.25 inch (6.35 mm) and polysulfone membrane 20 of thickness between about 1 and 1.5 mil (0.0254 mm and 0.0381 mm), the membrane will most likely rupture at a rupture pressure between about 90 and 120 psig ($620 \times 10^3$ and $827 \times 10^3$ pascal gage). The above vent aperture diameter is based on the assumption of a circular aperture 70 shape. However, although the circular shape is preferred, it is not intended that the vent aperture shape be limited to circular in any of the embodiments of the invention described herein. Other vent aperture 70 shapes such as elliptical or polygonal shapes can also be used. The term vent aperture diameter as used herein shall be understood to be the circular equivalent of such oddly shaped apertures. That is, the equivalent circular diameter, D, of a non circular vent aperture 70 of cross sectional area, S, is computed by applying the formula ¼ $\pi D^2 = S$. It will be appreciated that the aperture size and membrane 20 thickness can be adjusted to other combinations, generally in accordance with the above formula, $P_r = t/R \times S$, to achieve the desired rupture pressure. The constraints are that if the vent aperture 70 is too large it is more prone to accidental penetration by an outside object. Also, if rupturable membrane 70 is made too thin this will make handling of the membrane more difficult and makes the membrane more prone to breakage during installation into the seal assembly 80.

The internal cell components are shown in FIG. 1. The finished battery 10 (FIGS. 1 and 1B) comprises one cell. The cell comprises a cathode 60 comprising $MnO_2$, an anode 40 comprising zinc, and a separator 50 therebetween. Separator 50 is permeable to alkaline electrolyte, preferably aqueous potassium hydroxide. The anode 40 and cathode 60 are substantially rectangular slabs of small thickness. Anode slab 40, separator 50, and cathode slab 60 are stacked body to body (as in a stack of coins) as shown in FIG. 1. There can be some void space between the anode 40 and top cover 15 as shown in FIG. 1 to allow for possible expansion of the anode and cathode during cell discharge. The phrase anode and cathode slabs, "stacked body to body", as used herein with respect to all embodiments shall be understood to mean that the anode and cathode are stacked one on top of the other (with the separator therebetween) so that a major surface of the anode and a major surface of the cathode are adjacent to and face each other (as in a stack of coins). The cathode 60 is itself conveniently fabricated from multiple rectangular or square slabs of small thickness comprising compacted $MnO_2$ particles. The $MnO_2$ slabs, e.g. four slabs 60a–60d are inserted into housing 90 and aligned in a row, with the two end slabs 60a and 60d fitted flush against housing 90 and two middle slabs 60b and 60c placed such that there is a equidistant spacing between the four slabs.

The four slabs 60a–60d are then compressed downwardly to form the final cathode 60. The thickness of the cathode 60 is lower than the original thickness of each of the individual slabs as the slabs becomes compressed and the spaces between them become filled in with compressed cathode material. It has been determined advantageous to fabricate the cathode 60 in such manner from multiple individual MnO$_2$ slabs instead of manufacturing one single elongated MnO$_2$ slab. Manufacture of a single MnO$_2$ slab having a length approximately equal to the length of housing 90, would be more prone to breakage during the manufacturing process. It will be appreciated that although the cathode 60 is fabricated from individual MnO$_2$ slabs, when the MnO$_2$ slabs (60a–60d) are laterally pressed together as shown in FIG. 1 a single cathode 60 is formed. Anode 40 is preferably a rectangular slab comprising particulate zinc. The separator 50 has a flat rectangular surface interfacing between anode 40 and cathode 60. Separator 50 may be composed of materials conventionally employed in zinc/MnO$_2$ alkaline cells. Such materials are typically cellulosic, for example, comprising polyvinylalcohol and cellulose fibers, which are permeable to alkaline electrolyte.

Figure 2A:
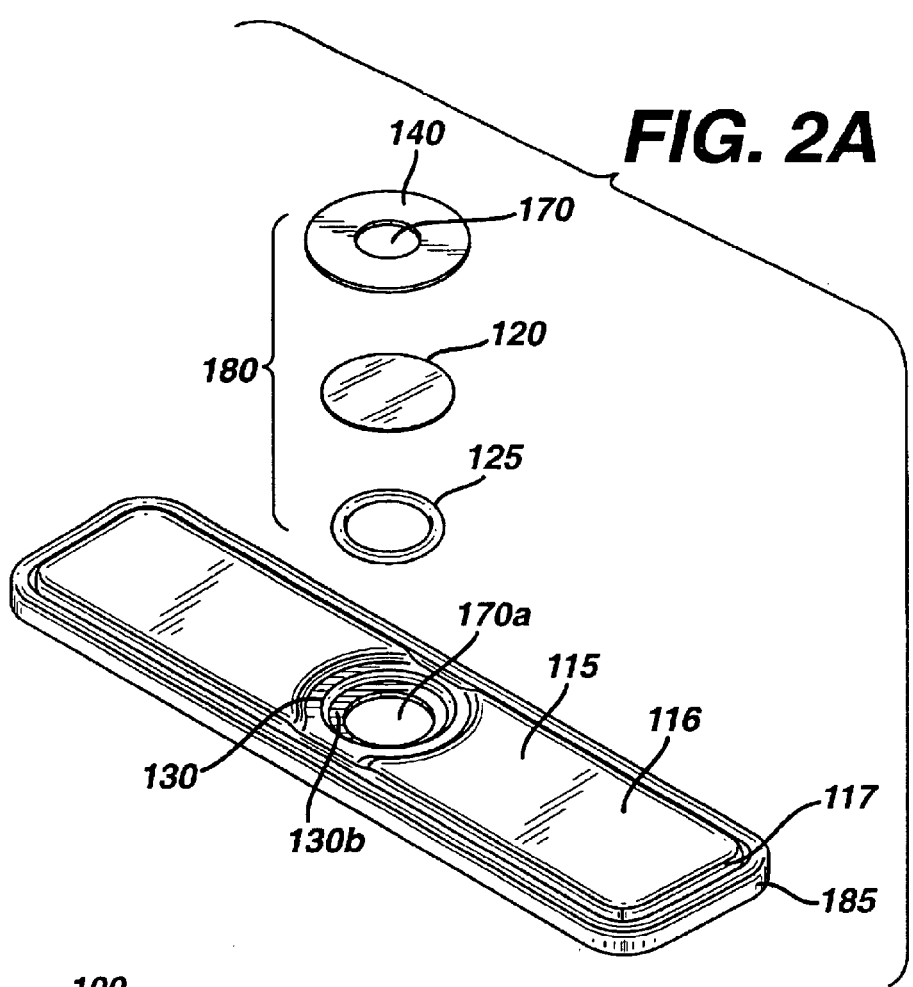
FIG. 2A is an exploded view showing the vent assembly of the embodiment of the flat alkaline battery shown in FIG. 2.
Figure 2B:
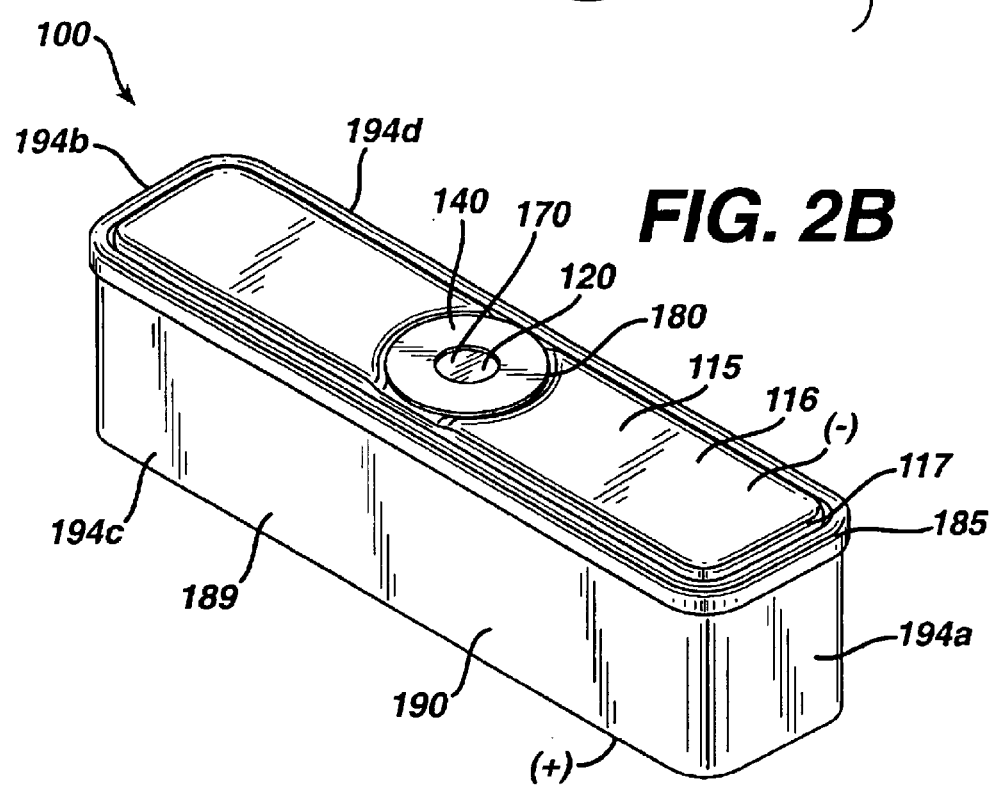
FIG. 2B is a perspective view of the battery comprising the components shown in FIG. 2.

Another specific embodiment of the flat battery (alkaline cell) 100 of the invention is shown in FIGS. 2–2B. The alkaline cell 100 (FIGS. 2–2B) has an outer metal casing 189 having an elongated metal body surface with a major portion thereof having a flat polygonal shape. The outer casing 189 may have the overall shape of a polyhedron having flat polygonal surfaces. In a specific embodiment shown in FIGS. 2 and 2B, the alkaline cell 100 has the overall shape of a cuboid (rectangular parallelepiped). Cell 100 has an outer metal casing 189 comprising a housing 190 which is sealed with a top cover 115. The housing 190 is preferably of nickel plated cold rolled steel or stainless steel and the top cover 115 is preferably of tin plated cold rolled steel or stainless steel. The cell contents comprises an anode 40 comprising particulate zinc, a cathode 60 comprising manganese dioxide and a separator 50 therebetween as shown in FIG. 2. Any portion of the top cover 115 can function as the cell's negative terminal (−) and any portion of the housing 190 can function as the cell's positive terminal (+)

The metal housing 190 has a bottom flat surface 192 with a pair of opposing vertical end walls 194a and 194b forming opposing ends of the housing and a pair of vertical side wall 194c and 194d forming the long sides of the housing (FIG. 2B). Housing 190 thus has an elongated top opening 193 (FIG. 2). The side walls 194c and 194d are preferably all integral with the bottom surface 192, that is, the housing 190 is an integral piece. The top cover 115 has a flat top surface 116 which extends to downwardly sloping edge 117 terminating in outer edge 118. There is an outer insulating seal 185 circumventing the outer peripheral edge 118 of the top cover 115. Preferably outer insulating seal 185 is in the form of a molded plastic ring which is molded to and covers outer edge 118 of the top cover or is in the form of a separate "stand-alone" molded plastic ring that is placed over outer edge 118 of top cover 115. After the cell contents are inserted into the interior of housing 190, the cover 115 is inserted over the open top 193 of housing 190 and the peripheral edge 196 of housing 190 is crimped over outer insulating seal 185.

The top cover 115 has a vent aperture 170 in its top surface 116. Aperture 170 creates a vent space through which hydrogen gas can be gradually released to the environment by permeation through membrane 120. In the case of a sudden surge in the cell's internal gas pressure, membrane 120 will rupture through aperture 170 and release the gas to the environment. The vent aperture 170 in top surface 116 is bounded by a convoluted edge 130 which forms a crimp ring analogous to crimp ring 30 shown in the above described embodiment of FIG. 1. The difference is that crimp ring 130 (FIG. 2) is an integral portion of top surface 116 of cover 115 whereas crimp ring 30 (FIG. 1) is a separate piece which has to be welded to the cover 15. Thus in the embodiment of the battery 100 shown in FIG. 2 there is no welding needed in order to secure crimp ring 130 to top surface 116, since the crimp ring 130 is an integral portion of top surface 116. The crimp ring 130 comprises an integral inner leg 130a which terminates in peripheral edge 130b defining the boundary of vent space 170a. The crimp ring 130 is downwardly sloping so that its peripheral edge 130b is below the level of surface 116 of top cover 115. The crimp edge 130 is readily shaped to the desired configuration by stamping against a die of same convolution.

The seal assembly 180 as shown best in FIGS. 2 and 2A comprises a crimp ring 130, an insulating seal ring 125, rupturable membrane 120, and vent washer 140 as shown in FIGS. 2 and 2A. The seal assembly 180 as shown in FIG. 2 is designed to hold a rupturable vent membrane 120 tightly in position across vent space 170a. The rupturable membrane 120 is sandwiched between insulating ring 125 and vent cover 140. The crimped edge 130b of crimp ring 130 presses against insulating ring 125 thereby holding membrane 120 tightly in place against vent cover 140. Vent cover 140 can be in the form of a washer 140 (FIGS. 2 and 2A) with an aperture 170 therethrough. The washer 140 is secured to crimp edge 130 by welding it along its edge to preferably the inner leg 130a of crimp edge 130. Seal ring 25 is desirably of nylon but may be of a rubbery or other plastic material that is compressible, resilient and durable and can withstand exposure to alkaline. In the embodiment shown in FIG. 2 the outer side of rupturable membrane 120 faces aperture 170 in vent washer 140. The inner side of rupturable membrane 120 faces vent space 170a defined by the peripheral edge 130b of crimp ring 130. Thus, if hydrogen gas pressure within the interior of the cell builds up abruptly to exceed the membrane burst pressure, membrane 120 will rupture allowing gas to escape safely to the environment.

Figure 3:
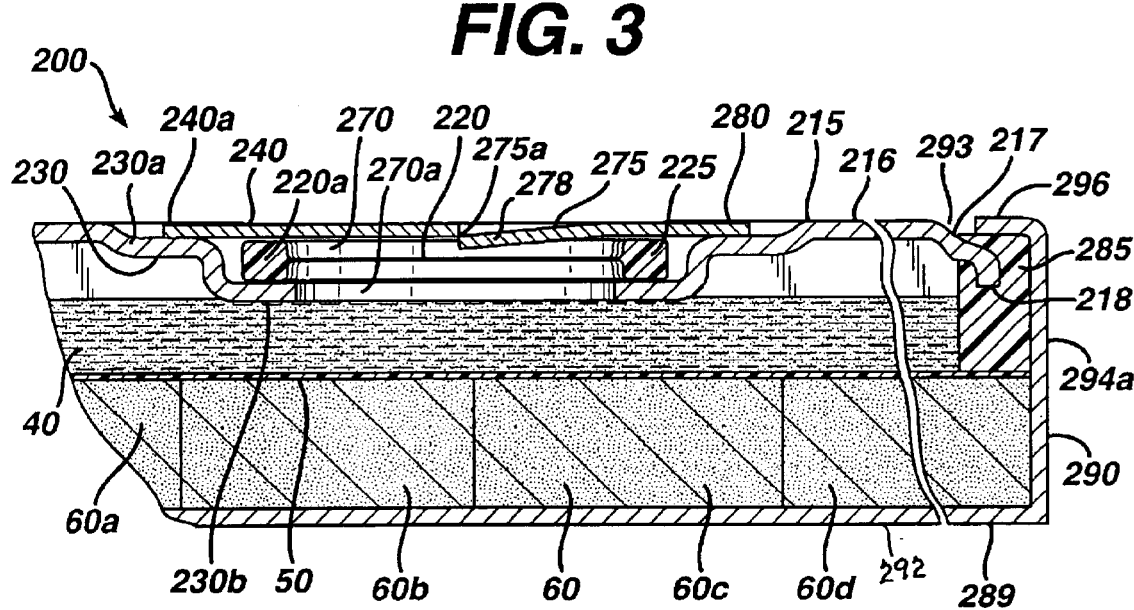
FIG. 3 is a longitudinal cross section of a third embodiment of the flat alkaline battery of the invention.
Figure 3A:
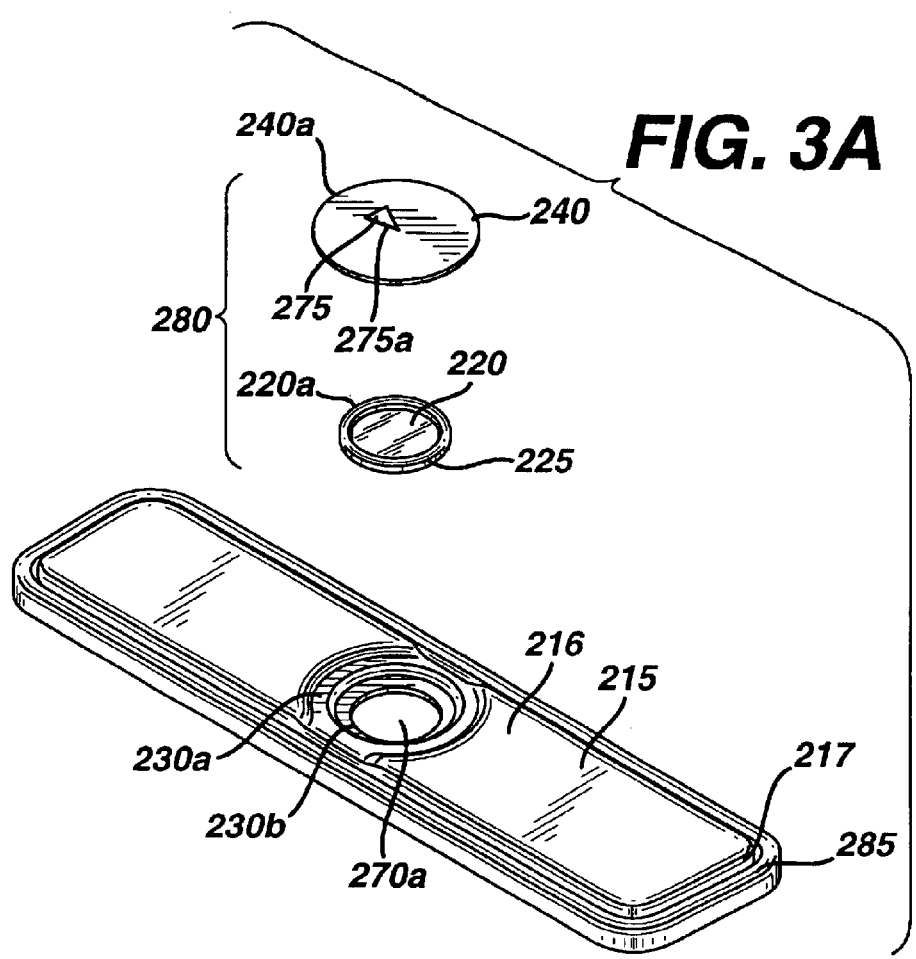
FIG. 3A is an exploded view showing the vent assembly of the embodiment of the flat alkaline battery shown in FIG. 3.
Figure 3B:
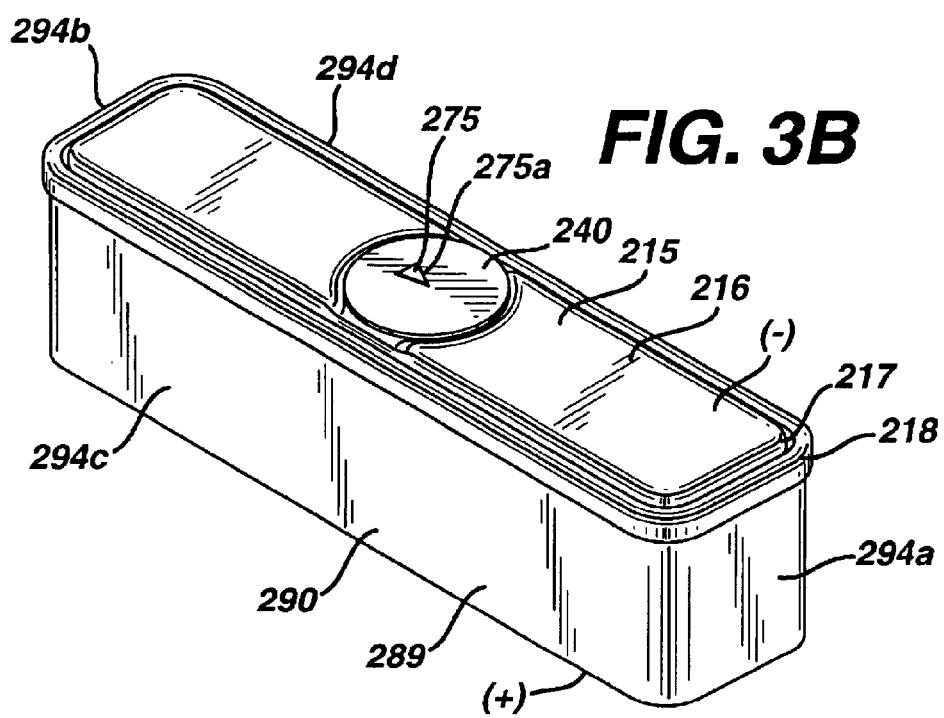
FIG. 3B is a perspective view of the battery comprising the components shown in FIG. 3.

Another specific embodiment of the flat battery (alkaline cell) 200 of the invention is shown in FIGS. 3–3B. The alkaline cell 200 (FIGS. 3–3B) has an outer metal casing 289 having an elongated metal body surface with a major portion thereof having a flat polygonal shape. The outer casing 289 may have the overall shape of a polyhedron having flat polygonal surfaces. In a specific embodiment shown in FIGS. 3 and 3B, the alkaline cell 200 has the overall shape of a cuboid (rectangular parallelepiped). Cell 200 has an outer metal casing 289 comprising a housing 290 which is sealed with a top cover 215. The housing 290 is preferably of nickel plated cold rolled steel or stainless steel and the top cover 215 is preferably of tin plated cold rolled steel or stainless steel. The cell contents comprises an anode 40 comprising particulate zinc, a cathode 60 comprising manganese dioxide and a separator 50 therebetween as shown in FIG. 3. Any portion of the top cover 215 can function as the cell's negative terminal (−) and any portion of the housing 290 can function as the cell's positive terminal (+).

The metal housing 290 has a bottom flat surface 292 with a pair of opposing vertical end walls 294a and 294b forming opposing ends of the housing and a pair of vertical side wall 294c and 294d forming the long sides of the housing (FIG. 3B). Housing 290 thus has an elongated top opening 293 (FIG. 3). The side walls 294c and 294d are preferably all integral with the bottom surface 292, that is, the housing 290 is an integral piece. The top cover 215 has a flat top surface 216 which extends to downwardly sloping edge 217 terminating in outer edge 218. There is an outer insulating seal 285 circumventing the outer peripheral edge 218 of the top cover 215. Preferably outer insulating seal 285 is in the form of a molded plastic ring which is molded to and covers outer edge 218 of the top cover 215, or is in the form of a separate "stand-alone" molded plastic ring that is placed over outer edge 218 of top cover 215. After the cell contents are inserted into the interior of housing 290, the cover 215 is inserted over the open top 293 of housing 290 and the peripheral edge 296 of housing 290 is crimped over outer insulating seal 285.

The top cover 215 has a vent aperture 270 in its top surface 216 as shown in FIG. 3. The vent aperture 270 in top surface 216 is bounded by a convoluted edge 230 which forms a crimp ring analogous to crimp ring 130 shown in the above described embodiment of FIG. 2. Crimp ring 230 is an integral portion of top surface 216 of cover 215. Thus, in the embodiment of the battery 200 shown in FIG. 3 there is no welding needed in order to secure crimp ring 230 to top surface 216. The crimp ring 230 comprises an integral inner leg 230a which terminates in peripheral edge 230b defining the boundary of vent space 270a. Crimp ring 230 is downwardly sloping so that its peripheral edge 230b is below the level of surface 216 of top cover 215. The crimp ring 230 is readily shaped to the desired configuration by stamping against a die of same convolution.

The seal assembly 280 as best shown in FIGS. 3 and 3A comprises an insulating seal ring 220a, crimp ring 230, rupturable membrane 220, and vent cover 240 as shown in FIGS. 3 and 3A. The seal assembly 280 as shown in FIG. 3 is designed to hold a rupturable vent membrane 220 tightly in position across vent space 270. The rupturable membrane 220 is sandwiched between the peripheral edge 230b of crimp ring 230 and vent cover 240. In this embodiment (FIGS. 3–3A) rupturable membrane 220 is integrally molded to and surrounded by insulating sealing ring 225. Thus membrane 220 forms a thin membrane central portion surrounded by the thicker insulating sealing ring 225. The insulating sealing ring 225 and rupturable membrane 220 are integrally molded of same composition and form a single integral piece.

Vent cover 240 can be in the form of a washer or disk 240 (FIG. 3 and 3A). The disk 240 is secured by welding its edge 240a to preferably the inner leg 230a of crimp edge 230. In assembly the insulating ring 225 with rupturable membrane 220 is inserted between crimp ring 230 and the edge of vent cover 240. Seal ring 225 and integral rupturable membrane 220 is of material sufficiently permeably to hydrogen, such as polyethylene, polypropylene, nylon or polysulfone. However, polysulfone is preferred, since it has a high permeation to hydrogen and restricts entry of oxygen from the environment. The peripheral edge 230b of crimp ring 230 can then be mechanically crimped against insulating sealing ring 225 thereby securing insulating ring 225 firmly in place between crimp ring 230 and vent cover 240. The vent cover 240 as shown best in FIG. 3 and 3B is desirably a solid disk having a small portion of its surface cut inwardly through cut line 275a to form a pointed protruding piece 275 which breaks through the bottom surface of disk 240. The pointed protruding piece 275 penetrates passed the bottom surface plane of disk 240, but nevertheless remains physically connected to disk 240. The cut line 275a results in a small slit through disk 240 in the shape of protruding piece 275. In the embodiment shown in FIG. 3 the outer side of rupturable membrane 220 faces aperture 270 and also the downwardly protruding pointed piece 275. The inner side of rupturable membrane 220 faces vent space 270a defined by the peripheral edge 230b of crimp ring 230. If hydrogen gas in the cell builds up very gradually, the hydrogen will permeate through membrane 220 and pass to the environment through slit 275a in the surface of disk 240 defined by the protruding piece 275. If hydrogen gas pressure within the interior of the cell builds up rapidly to exceed the membrane 220 burst pressure, then membrane 220 will expand outwardly. At the point immediately preceding rupture, membrane 220 impinges against protruding puncture piece 275. At the moment of rupture, puncture point 278 at the tip of protruding piece 275 produces a tear in the surface of membrane 220. This allows gas to escape quickly through the tear without carrying large amounts of liquid electrolyte with it.

Figure 4:
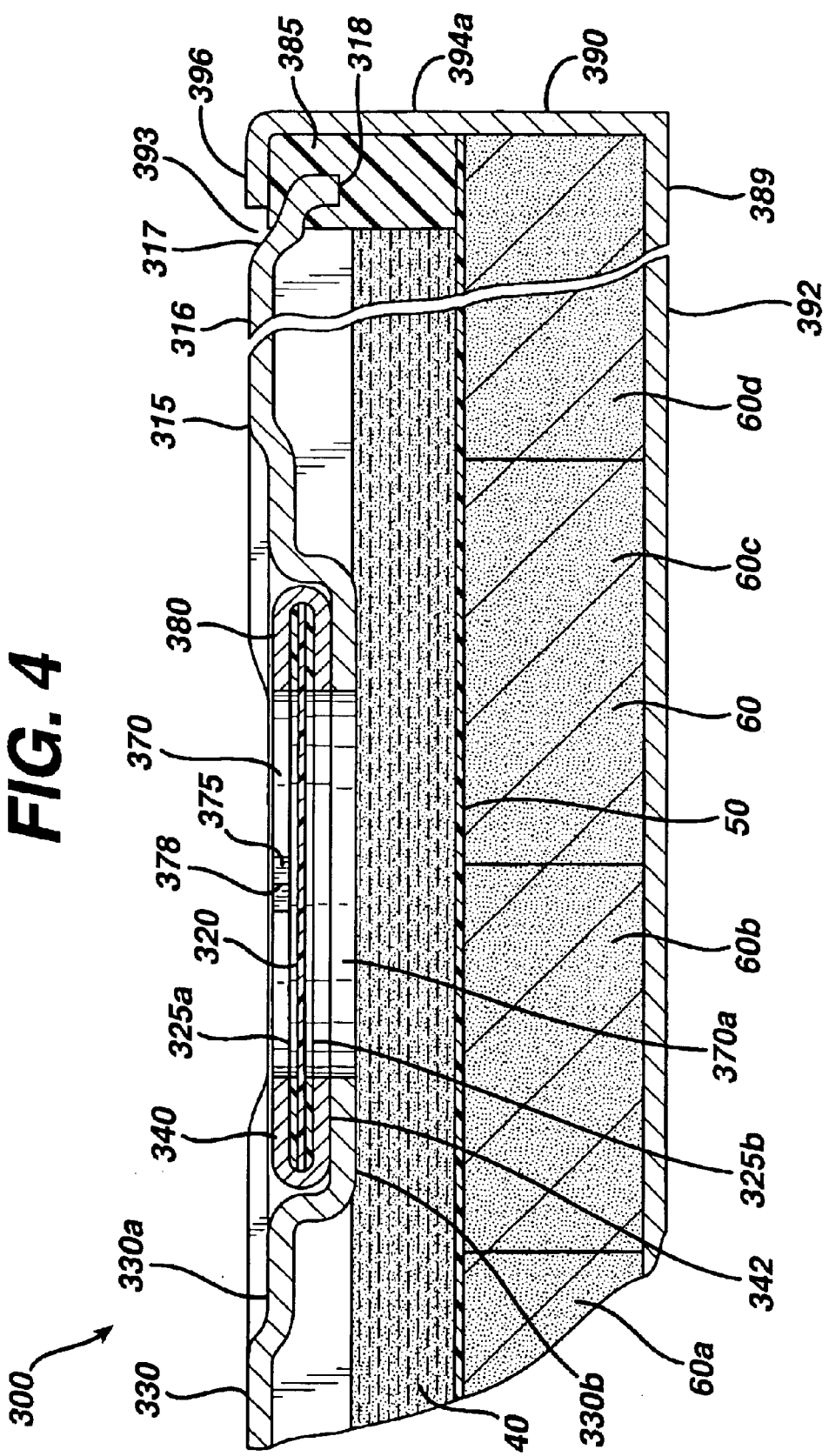
FIG. 4 is a longitudinal cross section of a fourth embodiment of the flat alkaline battery of the invention.
Figure 4A:
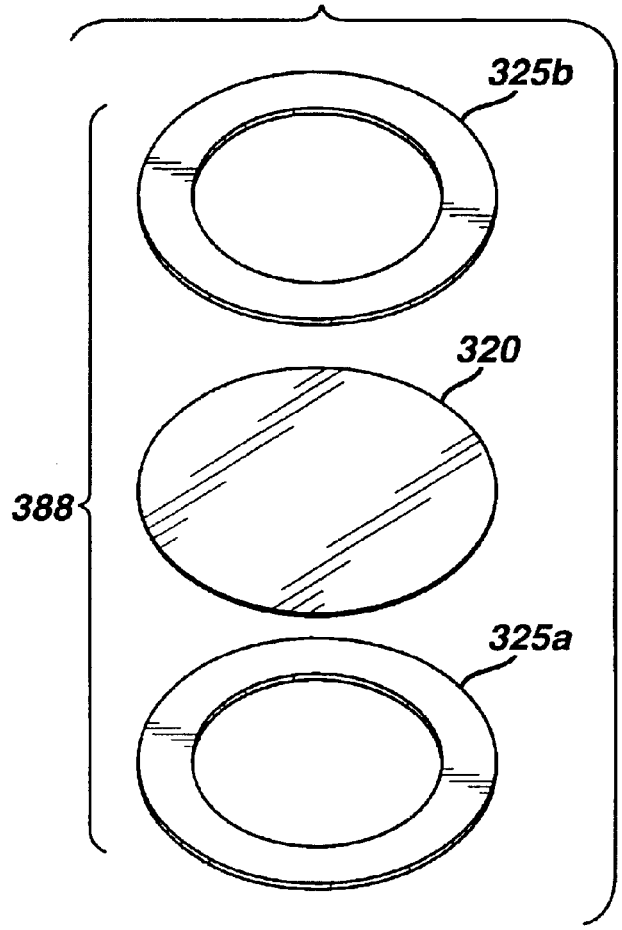
FIG. 4A is an exploded view showing components of the vent assembly of the embodiment of the flat alkaline battery shown in FIG. 4.
Figures 1, 4A:
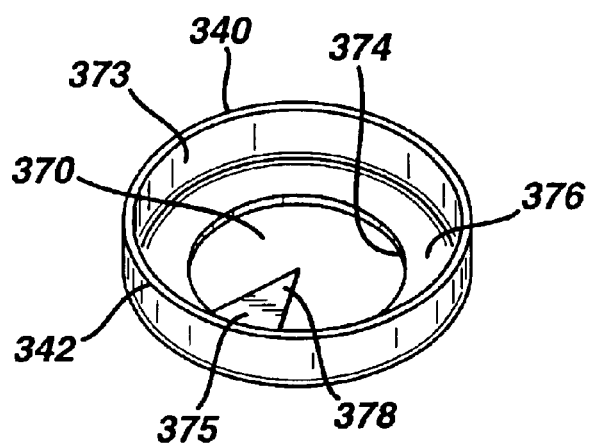
Figure 4B:
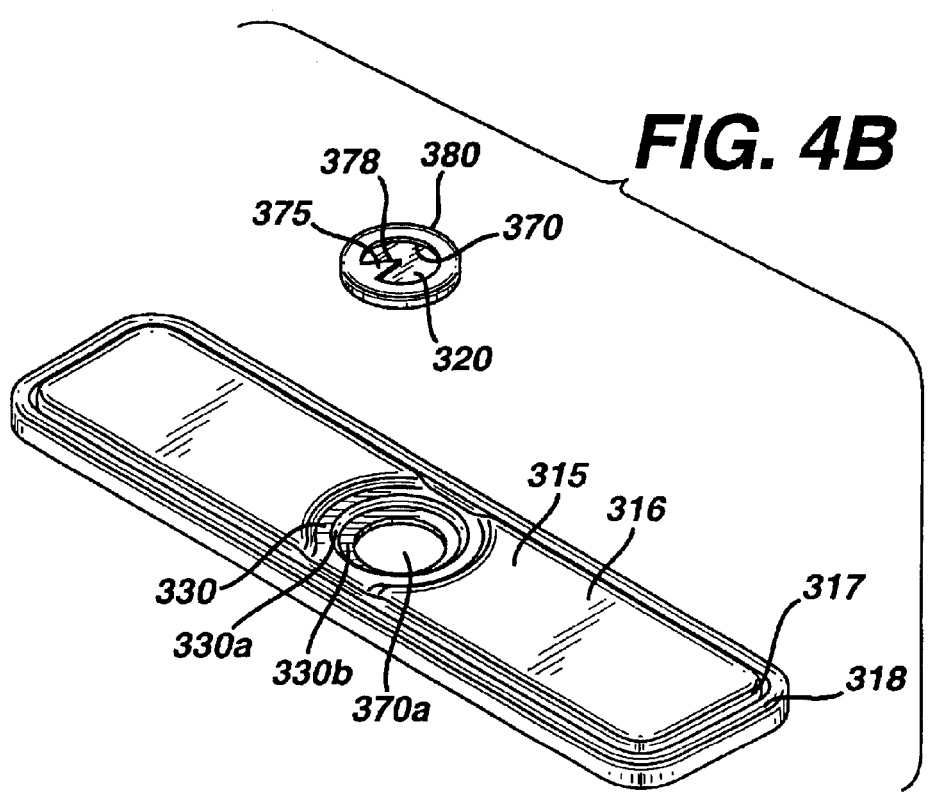
FIG. 4B is an exploded view showing the completed vent assembly to be inserted into the vent aperture within the top cover.
Figure 4C:
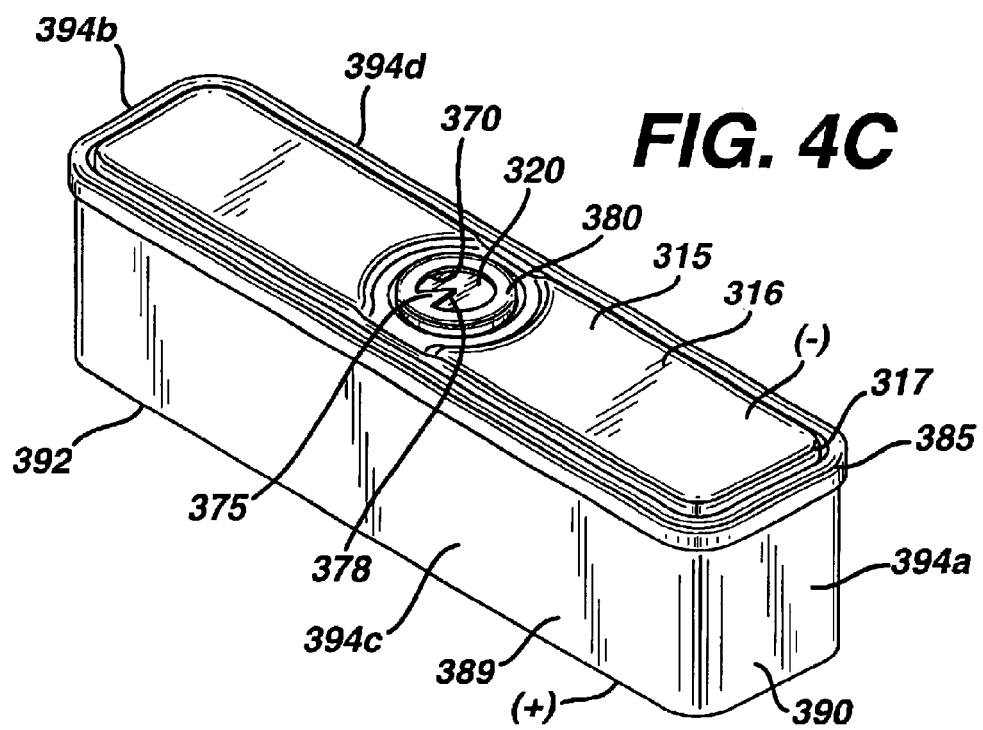
FIG. 4C is a perspective view of the battery comprising the components shown in FIG. 4.

Another specific embodiment of the flat battery (alkaline cell) 300 of the invention is shown in FIGS. 4–4C. The alkaline cell 300 (FIGS. 4 and 4C) has an outer metal casing 389 having an elongated metal body surface with a major portion thereof having a flat polygonal shape. The outer casing 389 may have the overall shape of a polyhedron having flat polygonal surfaces. In a specific embodiment shown in FIGS. 4 and 4C, the alkaline cell 300 has the overall shape of a cuboid (rectangular parallelepiped). Cell 300 has an outer metal casing 389 comprising a housing 390 which is sealed with a top cover 315. The housing 390 is preferably of nickel plated cold rolled steel or stainless steel and the top cover 315 is preferably of tin plated cold rolled steel or stainless steel. The cell contents comprises an anode 40 comprising particulate zinc, a cathode 60 comprising manganese dioxide and a separator 50 therebetween as shown in FIG. 4. Any portion of the top cover 315 can function as the cell's negative terminal (−) and any portion of the housing 390 can function as the cell's positive terminal (+).

The metal housing 390 has a bottom flat surface 392 with a pair of opposing vertical end walls 394a and 394b forming opposing ends of the housing and a pair of opposing vertical side wall 394c and 394d forming the long sides of the housing (FIG. 4C). Housing 390 thus has an elongated top opening 393 running along the length of the housing. The side walls 394c and 394d are preferably all integral with the bottom surface 392, that is, the housing 390 is an integral piece. The top cover 315 has a flat top surface 316 which extends to downwardly sloping edge 317 terminating in outer edge 318. There is an outer insulating seal 385 circumventing the outer peripheral edge 318 of the top cover 315. Preferably outer insulating seal 385 is in the form of a molded plastic ring which is molded to and covers outer edge 318 of top cover 315, or is in the form of a separate "stand-alone" molded plastic ring that is placed over outer edge 318 of top cover 315. After the cell contents are inserted into the interior of housing 390, the cover 315 is inserted over the open top 393 of housing 390 and the peripheral edge 396 of housing 390 is crimped over outer insulating seal 385.

The top cover 315 has a vent aperture 370a in its top surface 316. The vent aperture 370a in top surface 316 is bounded by a convoluted edge 330 which forms a crimp ring analogous to crimp ring 130 shown in the above described embodiment of FIG. 2. Crimp ring 330 is an integral portion of top surface 316 of cover 315. Thus, in the embodiment of the battery 300 shown in FIG. 4 there is no welding needed in order to secure crimp ring 330 to top surface 316. The crimp ring 330 comprises an integral inner leg 330a which terminates in peripheral edge 330b defining the boundary of vent space 370a. The crimp ring 330 is downwardly sloping so that its peripheral edge 330b is below the level of surface 316 of top cover 315. The crimp ring 330 is readily shaped to the desired configuration by stamping against a die of same convolution.

The seal assembly 380 as best shown in FIGS. 4A and 4B comprises a top insulating seal ring 325a, rupturable membrane 320, bottom insulating seal ring 325b, and vent disk 340. The insulating seal rings 325a and 325b are formed of resilient thermoplastic material which can withstand contact with alkaline electrolyte. Insulating seal rings 325a and 325b may be formed of polyethylene or polypropylene, preferably polysulfone or nylon. The rupturable membrane 320 is of material sufficiently permeably to hydrogen, such as polyethylene, polypropylene, nylon or polysulfone. However, polysulfone is preferred, since it has a high permeation to hydrogen and restricts entry of oxygen from the environment. The seal assembly 380 is made by placing the rupturable membrane 320 between the top seal ring 325a and bottom seal ring 325b and then applying heat and pressure to laminate these three components together to form a subassembly laminate 388 (FIG. 4A). The laminate 388 is then inserted into vent disk 340 (FIG. 4A-1). Vent disk 340 is an integrally formed metal disk defined by circumferential side wall 342 terminating in open end 373 and opposing partially open end 374. Vent disk 340 is preferably of nickel plated cold rolled steel or stainless steel. The partially open end 374 of vent disk 340 is defined by integrally formed end surface 376 having an aperture 370 therethrough. An integrally formed protruding piece 375 terminating in puncture point 378 juts into the aperture space 370 from end surface 376. The laminate 388 is inserted into the open end 373 of vent disk 340 so that top insulating sealing ring 325a lies adjacent aperture 370 and puncture point 378. The edge 342 of vent disk 340 is then crimped over laminate 378 to form the completed vent assembly 380 (FIG. 4B). The completed vent assembly 380 (FIG. 4) is then inserted onto the top surface of 316 of top cover 315 so that it rests on peripheral edge 330b of crimp ring 330. Vent assembly 380 is secured to crimp ring 330 by welding the crimped edge 342 of vent disk 340 to peripheral edge 330b of crimp ring 330 as shown in FIG. 4.

If hydrogen gas in the cell builds up very gradually, the hydrogen will pass from vent space 370a and through membrane 320 and to the environment through top aperture 370. If hydrogen gas pressure within the interior of the cell builds up rapidly to exceed the membrane 320 burst pressure, then membrane 320 will expand outwardly. At the point immediately preceding rupture, membrane 320 impinges against protruding puncture point 378. At the moment of rupture puncture point 378 at the tip of protruding piece 375 produces a tear in the surface of the membrane. This allows gas to escape quickly through the tear without carrying large amounts of liquid electrolyte with it.

Aperture Size and Rupturable Membrane Thickness

With respect to the above described embodiments, that is, for cells 10, 100, 200, and 300 when the rupturable membrane 20, 120, 220, and 320, respectively, is polysulfone film and vent aperture 70, 170, 270, and 370, respectively, is circular, the membrane diameter is desirably about 0.25 inch (6.35 mm) and the membrane thickness between about 1 and 1.5 mil (0.0254 mm and 0.0381 mm). In each case the rupturable membrane 20, 120, 220, and 320 lies adjacent to and covers vent aperture 70, 170, 270, and 370, respectively. For such vent aperture diameter of 0.25 inch (6.35 mm) and polysulfone rupturable membrane of thickness between about 1 and 1.5 mil (0.0254 mm and 0.0381 mm), the membrane will rupture at a desired rupture pressure between about 90 and 120 psig ($620 \times 10^3$ and $827 \times 10^3$ pascal gage). It will be appreciated that the vent aperture size and membrane thickness can be adjusted to other combinations to achieve the same burst pressure or other desired burst pressures by applying Equation (I) above described. The constraints are that if the vent aperture is made too large it may be prone to unintentional penetration from an outside object. Also if the rupturable membrane is made too thin, this will make handling of the membrane more difficult and makes the membrane more prone to breakage during installation into the vent seal assembly. With such constraints in mind for burst pressures between about 50 and 200 psia ($345 \times 10^3$ and $1379 \times 10^3$ pascal gage) the range in vent aperture diameter is desirably between about 4 and 10 mm and membrane thickness between about 0.5 and 2 mil. For burst pressures between about 90 and 200 psia ($620 \times 10^3$ and $1379 \times 10^3$ pascal gage) the range in vent aperture diameter is desirably between about 4 and 7 mm and membrane thickness between about 0.7 and 1.5 mil. The preferred rupturable membrane to achieve these objectives is polysulfone.

Chemical Composition of a Representative Cell

The following description of cell composition, that is, chemical composition of anode 40, cathode 60 and separator 50 is applicable to each of the cells 10, 100, 200 and 300 described in the above disclosed specific embodiments.

In each of the above described specific cell embodiments the cathode 60 comprises manganese dioxide, and an anode 40 comprising zinc and electrolyte. The aqueous electrolyte comprises a conventional mixture of KOH, zinc oxide, and gelling agent. The anode material 40 can be in the form of a gelled mixture containing mercury free (zero-added mercury) zinc alloy powder. That is, the cell has a total mercury content less than about 50 parts per million parts of total cell weight, preferably less than 20 parts per million parts of total cell weight. The cell also preferably does not contain any added amounts of lead and thus is essentially lead-free, that is, the total lead content is less than 30 ppm, desirably less than 15 ppm of the total metal content of the anode. Such mixtures can typically contain aqueous KOH electrolyte solution, a gelling agent (e.g., an acrylic acid copolymer available under the tradename CARBOPOL C940 from B.F. Goodrich), and surfactants (e.g., organic phosphate ester-based surfactants available under the tradename GAFAC RA600 from Rhône Poulenc). Such a mixture is given only as an illustrative example and is not intended to restrict the present invention. Other representative gelling agents for zinc anodes are disclosed in U.S. Pat. No. 4,563,404.

The cathode 60 desirably has the following composition:
87–93 wt % of electrolytic manganese dioxide (e.g., Trona D from Kerr-McGee), 2–6 wt % (total) of graphite, 5–7 wt % of a 7–10 Normal aqueous KOH solution having a KOH concentration of about 30–40 wt %; and 0.1 to 0.5 wt % of an optional polyethylene binder. The electrolytic manganese dioxide typically has an average particle size between about 1 and 100 micron, desirably between about 20 and 60 micron. The graphite is typically in the form of natural, or expanded graphite or mixtures thereof. The graphite can also comprise graphitic carbon nanofibers alone or in admixture with natural or expanded graphite. Such cathode mixtures are intended to be illustrative and are not intended to restrict this invention.

The anode material 40 comprises: Zinc alloy powder 62 to 69 wt % (99.9 wt % zinc containing indium), an aqueous KOH solution comprising 38 wt % KOH and about 2 wt % ZnO; a cross-linked acrylic acid polymer gelling agent available commercially under the tradename "CARBOPOL C940" from B.F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt.%); dionyl phenol phosphate ester surfactant available commercially under the tradename "RM-510" from Rhone-Poulenc (50 ppm). The zinc alloy average particle size is desirably between about 30 and 350 micron. The bulk density of the zinc in the anode (anode porosity) is between about 1.75 and 2.2 grams zinc per cubic centimeter of anode. The percent by volume of the aqueous electrolyte solution in the anode is preferably between about 69.2 and 75.5 percent by volume of the anode.

The cell can be balanced in the conventional manner so that the mAmp-hr capacity of $MnO_2$ (based on 308 mAmp-hr per gram $MnO_2$) divided by the mAmp-hr capacity of zinc alloy (based on 820 mAmp-hr per gram zinc alloy) is about 1.

The separator 50 can be a conventional ion porous separator consisting of an inner layer of a nonwoven material of cellulosic and polyvinylalcohol fibers and an outer layer of cellophane. Such a material is only illustrative and is not intended to restrict this invention.

Total Anode/Cathode Volume as Percent of Total Outer Casing External Volume

In each of the above described embodiments, that is for the described cell embodiments 10, 100, 200, and 300 when the cell is of F6 size and the anode 40, cathode 60 plus total electrolyte volume is totaled and divided by the external volume of the outer casing (e.g. casing 89, 189, 289 and 389) the result is about 66.3%. When the cell is of F6 size and the anode 40, cathode 60 plus total electrolyte volume plus separator volume is totaled and divided by the external volume of the outer casing the result is about 69.1%.

It will be appreciated that the above values for total volume of anode and cathode as a percent of external volume of the outer metal casing are very conservative, as they are not based on an optimized design. It is believed possible to increase the percent volume of total anode and cathode up to about 75 percent and even as high as about 80 percent or even up to about 85 percent of the external volume of the outer metal casing. This could be achieved, for example, by filling the anode so that the anode material 40 is compacted against the inside surface of the top cover (15, 115, 215, and 315) and by reducing the depth of the vent assembly (80, 180, 280 and 380) and reducing the size of the vent aperture (70, 170, 270 and 370). The wall thickness of the outer casing 89, 189, 289, and 389 could also be reduced to values as low as between about 4 and 10 mil (0.102 and 0.254 mm) to further improve the percent total anode/cathode volume as percent of total outer casing external volume.

Although the outer casing, e.g. casing 89, 189, 289 and 389 as described in the above specific embodiments is metallic, it is not intended to necessarily limit the outer casing of the battery of the invention to metal. The outer casing could also be of durable plastic material resistant to alkaline electrolyte, for example, polyethylene, polypropylene, nylon, and the like.

Although the preferred embodiments of the invention have been described with respect to a flat alkaline battery having the overall shape of a cuboid (rectangular parallelepiped), it will be appreciated that variations of such overall shape are possible and are intended to fall within the concept of the invention. For example, the vent assembly embodiments described in the above specific embodiments could also be applied to the outer casing of cylindrical cells, for example, AAAA, AAA, AA, C, and D size cylindrical alkaline cells. In the case of a flat battery, for example, in the shape of a cuboid (rectangular parallelepiped, the terminal ends of the rectangular parallelepiped could be slightly outwardly or inwardly curved. The overall appearance of such varied shape is still substantially that of a cuboid and is intended to fall within the meaning of cuboid or legal equivalent thereof. Other variation to the overall shape such as altering somewhat the angle that the ends of the battery make with any one of the parallelograms comprising the battery body so that the parallelepiped is a deviation from strict rectangular is also intended to fall within the meaning of cuboid (rectangular parallelepiped) as used herein and in the claims.

The present invention is intended to extend desirably to an overall battery shape that is flat in that a side of the outer casing along the length of the casing is substantially flat. Thus, it shall be understood also that the term "flat" is intended to extend to and include surfaces that are substantially flat in that the degree of curvature of such surface may be slight. The depth of the battery casing is typically smaller than the length of the battery. In particular the concept of the present invention is intended to extend to flat batteries wherein a side of the battery casing surface along the length of the casing has a flat polygonal surface. The battery may have the overall shape of a polyhedron with all sides of the outer casing being polygonal. The invention is also intended to extend to batteries wherein a side of the battery casing along its length has a flat surface which is a parallelogram and wherein the overall shape of the battery is prismatic.

What is claimed is:

1. An electrochemical cell generating hydrogen gas upon discharge, said cell comprising an outer casing, a positive and a negative terminal, and a vent aperture passing through a wall of said casing and a rupturable membrane covering said vent aperture, wherein a vent assembly is secured within said vent aperture, wherein said vent assembly comprises said rupturable membrane and an overlying metallic disk adjacent said membrane, said disk having an opening therethrough facing said membrane so that as hydrogen gas within said cell interior builds up it escapes to the environment by passing through said membrane and said disk opening.

2. The electrochemical cell of claim 1 wherein said outer casing has a flat wall running along the length of said casing and said vent aperture passes through said flat wall.

3. The electrochemical cell of claim 2 wherein said cell is in the shape of a cuboid.

4. The electrochemical cell of claim 1 wherein said metallic disk has an integral pointed member therein extending into said opening within said disk so that if gas pressure builds up rapidly within the cell, the membrane expands and impinges against said pointed member thereby producing a tear in said membrane allowing hydrogen gas to escape therethrough.

5. The electrochemical cell of claim 1 wherein said cell comprises an anode comprising zinc, a cathode comprising manganese dioxide and said cell comprises an electrolyte comprising aqueous potassium hydroxide.

6. The electrochemical cell of claim 1 wherein said membrane ruptures when hydrogen gas within the cell rises to a threshold level between about 50 and 200 psig ($345 \times 10^3$ and $1379 \times 10^3$ pascal gage).

7. The electrochemical cell of claim 1 wherein said membrane comprises polysulfone.

8. The electrochemical cell of claim 1 wherein said rupturable membrane has a thickness between about 1 and 1.5 mil (0.0254 mm and 0.0381 mm).

9. The electrochemical cell of claim 1 wherein said outer casing is metallic.

10. An electrochemical cell generating hydrogen gas upon discharge, said cell comprising a metallic outer casing, a positive and a negative terminal, a vent aperture passing through a wall of said casing, and a rupturable membrane covering said vent aperture, wherein a vent assembly is secured within said vent aperture, wherein said vent assembly comprises said rupturable membrane being clamped between a pair of metallic disks, said metallic disks each having an aperture therethrough thereby exposing at least a portion of the membrane to the external environment, so that as hydrogen gas within said cell interior builds up it escapes to the environment through said membrane and said apertures in said metallic disks.

11. The electrochemical cell of claim 10 wherein said outer casing has a flat wall running along the length of said casing and said vent aperture passes through said flat wall.

12. The electrochemical cell of claim 10 wherein the cell comprises an anode comprising zinc, a cathode comprising manganese dioxide and said cell comprises an electrolyte comprising aqueous potassium hydroxide.

13. The electrochemical cell of claim 10 wherein said cell is in the shape of a cuboid.

14. The electrochemical cell of claim 10 wherein said vent assembly further comprises a housing holding said membrane and said metallic disks therein, wherein said vent assembly housing has an opening in its surface.

15. The electrochemical cell of claim 14 wherein said vent assembly housing has an integral pointed member therein extending into said opening within said vent assembly housing so that when gas pressure builds up rapidly within the cell, the membrane expands and impinges against said pointed member thereby producing a tear in said membrane allowing hydrogen gas to escape therethrough.

16. The electrochemical cell of claim 10 wherein said membrane ruptures when hydrogen gas within the cell rises to a threshold level between about 50 and 200 psig ($345 \times 10^3$ and $1379 \times 10^3$ pascal gage).

17. The electrochemical cell of claim 10 wherein said membrane comprises polysulfone.

18. The electrochemical cell of claim 10 wherein said rupturable membrane has a thickness between about 1 and 1.5 mil (0.0254 mm and 0.0381 mm).

19. An electrochemical cell generating hydrogen gas upon discharge, said cell comprising an outer casing, a positive and a negative terminal, and a vent aperture passing through a wall of said casing, wherein a rupturable membrane covers said aperture; wherein said outer casing has a flat wall running along the length of said casing and said vent aperture passes through said flat wall; wherein said casing comprises a metallic housing and a metallic cover; said housing comprising a pair of opposing parallel flat ends and a pair of opposing parallel flat sides therebetween, and a flat bottom between said ends and sides, wherein said housing has an open top opposite said flat bottom, wherein said cover is inserted to seal the open top of said housing after anode, cathode and electrolyte have been inserted into said housing; wherein said cover has an elongated flat wall and said vent aperture passes through said elongated flat wall, wherein said rupturable membrane covers said vent aperture in said elongated flat wall, wherein a metallic disk having an opening therethrough covers said rupturable membrane so that hydrogen gas from within the cell interior can escape to the environment by passing through said membrane and said disk opening.

20. An electrochemical cell generating hydrogen gas upon discharge, said cell comprising an outer casing, a positive and a negative terminal, and a vent aperture passing through a wall of said casing, wherein a rupturable membrane covers said aperture; wherein said outer casing has a flat wall running along the length of said casing and said vent aperture passes through said flat wall; wherein said casing comprises a metallic housing and a metallic cover; said housing comprising a pair of opposing parallel flat ends and a pair of opposing parallel flat sides therebetween, and a flat bottom between said ends and sides, wherein said housing has an open top opposite said flat bottom, wherein said cover is inserted to seal the open top of said housing after anode, cathode and electrolyte have been inserted into said housing; wherein said cover has an elongated flat wall and said vent aperture passes through said elongated flat wall, wherein said rupturable membrane covers said vent aperture in said elongated flat wall, wherein a metallic disk having an opening therethrough covers said rupturable membrane so that hydrogen gas from within the cell interior can escape to the environment by passing through said membrane and said disk opening; wherein a pointed member forming an integral portion of said metallic disk extends into said opening in said disk so that when hydrogen gas builds up to a threshold pressure between about 50 and 200 psia ($345 \times 10^3$ and $1379 \times 10^3$ pascal gage), said membrane ruptures and is abraded by said pointed member during rupture.

\* \* \* \* \*